US006793132B2

(12) United States Patent
Takahashi

(10) Patent No.: US 6,793,132 B2
(45) Date of Patent: Sep. 21, 2004

(54) APPARATUS FOR INPUTTING OUTPUTTING MONEY, AND METHOD FOR IDENTIFYING MONEY INPUT AT THE APPARATUS AND COLLECTING THE MONEY

(75) Inventor: Tatsuya Takahashi, Fujisawa (JP)

(73) Assignee: International Business Machines Corporation, Armonk, NY (US)

(*) Notice: Subject to any disclaimer, the term of this patent is extended or adjusted under 35 U.S.C. 154(b) by 250 days.

(21) Appl. No.: 10/153,960

(22) Filed: May 23, 2002

(65) Prior Publication Data

US 2003/0038063 A1 Feb. 27, 2003

(30) Foreign Application Priority Data

Aug. 7, 2001 (JP) ....................................... 2001-239253

(51) Int. Cl.[7] ................................................ G06F 17/60
(52) U.S. Cl. .......................... 235/379; 235/385; 902/14
(58) Field of Search ................................ 235/380, 382, 235/383, 379, 385; 902/13, 14

(56) References Cited

U.S. PATENT DOCUMENTS

| | | | | | |
|---|---|---|---|---|---|
| 5,644,118 | A | * | 7/1997 | Hayashida | 235/379 |
| 6,109,522 | A | * | 8/2000 | Force et al. | 235/379 |
| 6,334,117 | B1 | * | 12/2001 | Covert et al. | 705/43 |
| 6,540,136 | B1 | * | 4/2003 | Ross | 235/379 |

FOREIGN PATENT DOCUMENTS

| | | | | |
|---|---|---|---|---|
| JP | 11175812 | * | 7/1999 | G07D/9/00 |

* cited by examiner

*Primary Examiner*—Daniel St. Cyr
(74) *Attorney, Agent, or Firm*—Daniel E. McConnell

(57) ABSTRACT

The present invention relates to an apparatus for inputting and outputting money, and to a method for identifying and collecting money that is input to this apparatus. Further, an apparatus for inputting and outputting money includes any type of apparatus, such as an automatic teller machine (ATM), a money exchange machine or an automatic vending machine, used for the input and the output of all types of currencies.

6 Claims, 2 Drawing Sheets

APPARATUS FOR INPUTTING OUTPUTTING MONEY, AND METHOD FOR IDENTIFYING MONEY INPUT AT THE APPARATUS AND COLLECTING THE MONEY

BACKGROUND OF THE INVENTION

1. Field of the Invention

The present invention relates to an apparatus for inputting and outputting money, and to a method for identifying and collecting money that is input to this apparatus. In this specification, the money used is money inclusive of both coinage (e.g., coins) and paper (e.g. notes). Further, an apparatus for inputting and outputting money includes any type of apparatus, such as an automatic teller machine (ATM), a money exchange machine or an automatic vending machine, used for the input and the output of all types of currencies.

2. Description of Related Art

FIG. 1 is a diagram showing the configuration of a conventional apparatus for inputting and outputting money. In FIG. 1, an apparatus 10 comprises: input means 1, having a money input port; identification means 2 for identifying money; means 3 for storing money as money for payment; means 4 for storing money as money for recovery; and money output means 5, having a money output port. The identification means 2 identifies money received by the money input means 1, and determines whether the money that is input should be transferred to the storage means 4 as money for recovery, or should be transferred to the money output means 5 as money for payment.

In the conventional apparatus in FIG. 1, generally, the money held in the storage means 3 is regularly supplemented so that the money that is available for payment is not reduced until it is equal to or less than a predetermined amount. In this case, only that amount of money that is required is used to supplement each currency type. For example, when new money is being issued, only new money is used to supplement the contents of the storage means 3, while at the same time, as the money is being supplemented, the specific currency that is input must be collected from the apparatus 10. For example, as new currency is being used for supplementation, old currency of the same type must be collected.

Money is collected while the amount of the currency available on the market is monitored. For example, when new money is being issued, and when an excessive amount of the same type of old money is collected before the new money is fully distributed, this currency may fall into short supply on the market. Therefore, an appropriate of amount of money must be collected as needed, while the amount available on the market and the amount used for supplementing the machine supply are monitored.

However, in the process performed by the conventional apparatus 10 for collecting a specific currency that is input, when this specific currency is identified by the identification means 2, regardless of the type and amount of the money to be supplemented, the identification means 2 unconditionally transfers this currency to the storage means 4 for collection. Therefore, when new currency is issued, more of the old currency of the same type may be collected than is necessary before full distribution of the new currency is achieved.

SUMMARY OF THE INVENTION

It is one object of the present invention to provide a money input/output apparatus that, in accordance with the amount of money distributed and available on the market, can adjust the amount of money to be collected.

It is another object of the present invention to provide a money input/output apparatus that, in accordance with the type or amount of money to be supplemented, can adjust the amount of money to be collected.

It is an additional object of the present invention to provide for a money input/output apparatus a method for identifying and collecting money that is input using this apparatus, so that the amount of money to be collected can be adjusted in accordance with the amount of money distributed and available on the market.

It is a further object of the present invention to provide for a money input/output apparatus a method for identifying and collecting money that is input using this apparatus, so that the amount of money to be collected can be adjusted in accordance with the type or amount of money to be supplemented.

According to the present invention, a money input/output apparatus comprises: reception means for accepting money that is input; first receipt means for storing money as money for payment; second receipt means for storing money as money for recovery; identification means for identifying money that is input through the reception means; and third means for comparing the money that is input, which has been identified by the identification means, with money for supplementation of the money stored in the first receipt means, and for transferring the money that is input to either the first or the second receipt means.

Further, according to the present invention, a method, for an apparatus for inputting and outputting money, for identifying money that is input and for collecting the money, comprises the steps of: (a) receiving money that is input; (b) identifying the money that is input; and (c) comparing the money that is input, and that is identified, with money in the apparatus that is used for supplementation, and for determining whether the money that is input should be output or collected.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

Figure 1:
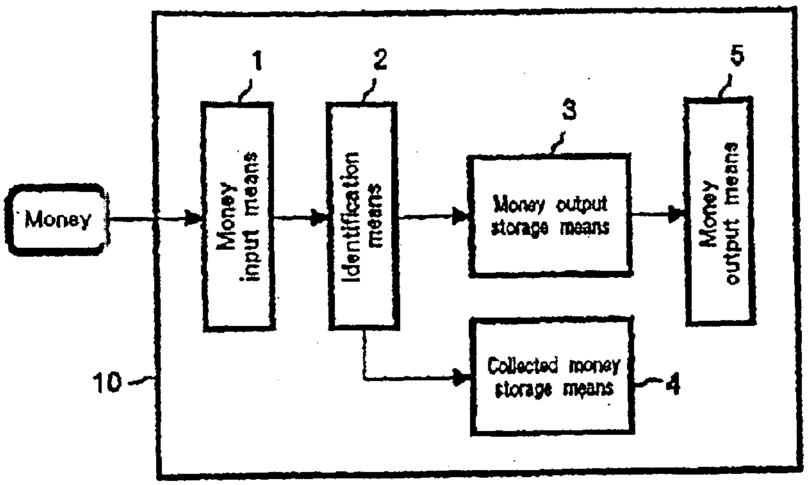
FIG. 1 is a diagram showing the configuration of a conventional money input/output apparatus.

The use of figure reference labels in the claims is intended to identify one or more possible embodiments of the claimed subject matter in order to facilitate the interpretation of the claims. Such labeling is not to be construed as necessarily limiting the scope of those claims to the embodiments shown in the corresponding figures. The preferred embodiments of the present invention and its advantages are best understood by referring to the drawings, like numerals being used for like and corresponding parts of the various drawings.

A preferred embodiment of the present invention will now be described in detail while referring to the accompanying drawings.

Figure 2:
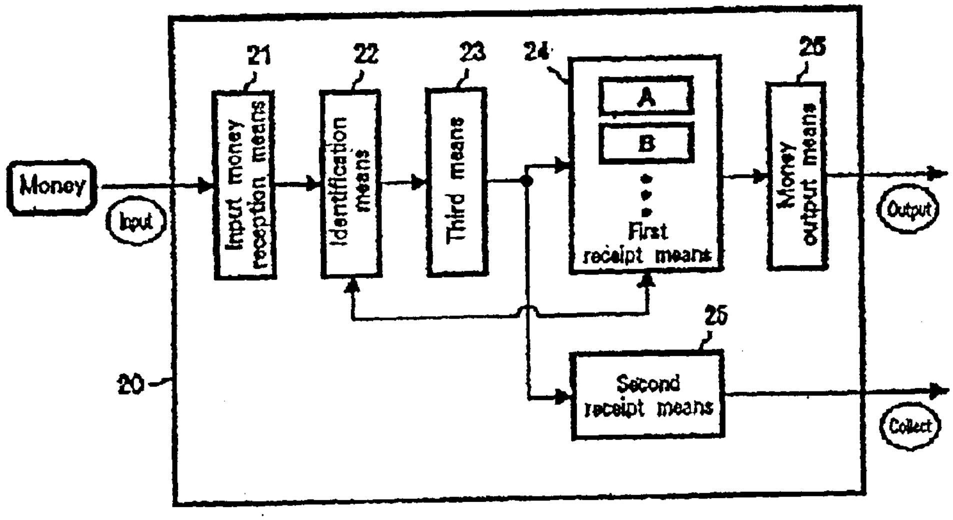
FIG. 2 is a diagram showing the configuration of a money input/output apparatus according to one embodiment of the invention; and, FIG. 3 is a diagram showing the configuration of third means in the apparatus in FIG. 2 according to the embodiment of the invention.

FIG. 2 is a diagram showing a money input/output apparatus according to one embodiment of the present invention. An apparatus 20 in FIG. 2 comprises: input money reception means 21, identification means 22, third means 23, first receipt means 24, second receipt means 25 and output means 26. The input money reception means 21, which has a money input port, receives money input through the money input port, and transfers the money to the following identification means 22. The identification means 22 determines the type of the money received by the input money reception means 21 and whether the money is counterfeit. Further, the identification means 22 can also identify money to be used for supplementing money held in the first receipt means 24. The money identified by the identification means 22 is then transferred to the third means 23. While in FIG. 2 the identification means 22 and the third means 23 are provided separately, these two means may be integrally formed.

The third means 23 compares the money that is input and is identified by the identification means 22 with the money used for supplementing the money held in the first receipt means 24, and transfers the money that is input to the first receipt means 24 or to the second receipt means 25. In the first receipt means 24, the money is stored, in accordance with each money type (value: A, B, . . . ), as money for payment. In the first receipt means 24, not only is money stored that is input, but also money that is to be directly supplemented as needed. The money stored in the first receipt means 24 is subsequently transferred to the money output means 26, which has a money output port, where it is used as money for payment. In the second receipt means 25, the money input is stored as money for recovery. The money in the second receipt means 25 is collected, as needed, from outside the apparatus.

Figure 3:
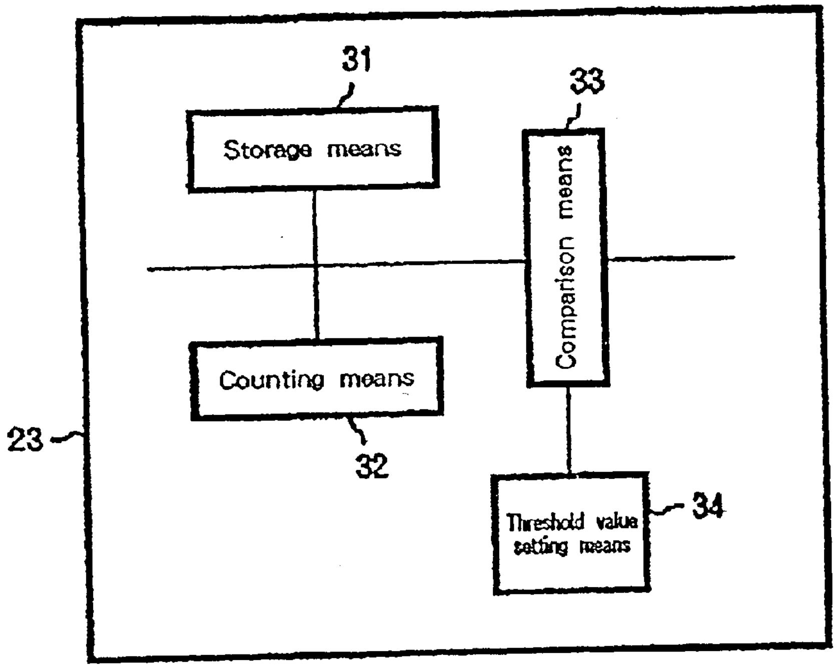

The third means 23 of the invention will now be described in more detail. As is shown in FIG. 3, the third means 23 includes: storage means 31 for storing the type of money that is identified; counting means 32 for counting, for each type, the amount of money based on the types of money stored in the storage means 31 and for obtaining the ratio of the amount of each type of money; and comparison means 33 for comparing the types of money that are identified, or the amount of money that is obtained or the ratio of the amount of money. Stored in the storage means 31 are the type of money input and the type of money used for supplementation, which are identified by the identification means 22. The comparison means 33 compares the type of money input with the type of money used for supplementation, and employs the comparison results to transmit the money input to either the first receipt means 24 or the second receipt means 25. The money type is representative of the value of a currency, or of new money or old money that is newly issued. Further, a conventional money type or a type obtained by the identification means 22 is employed as information as for the money type.

By way of example, a specific amount of money that is newly issued is to now be used for supplementing the first receipt means 24. The information for "new" money (a type) is stored in the storage means 31 as the type of money to be used for supplementation. The comparison means 33 compares the type of supplemented money with the type of money input that is identified by the identification means 22. When the type of money input matches the type of money used for supplementation, i.e., when the money input is "new" money, the comparison means 33 transfers the money to the first receipt means 24. The money that is input ("new" money) and transferred to the first receipt means 24 is used as money for payment. When the results of the comparison of the type of money input does not match the type of money used for supplementation, i.e., when the input money is "old" money having the same value, the comparison means 33 transfers the money input ("old" money) to the second receipt means 25. The money that is input ("old" money) and transferred to the second receipt means 25 is collected.

When only newly issued "new" money is to be supplemented, through this processing sequence, the apparatus 20 of the invention can identify, of the money input to the apparatus 20, only the same amount of "old" money as the "new money" that is available, and collect this "old" money.

By way of example, both a specific amount of "old" money and "new" money that is newly issued are now to be used together to supplement the first receipt means 24. The identification means 22 identifies the supplemented money as "new" or "old". The identification results obtained by the identification means 22 are stored in the storage means 31 of the third means 23. The counting means 32 counts the amount of "new" or "old" money stored in the storage means 31, calculates the ratio "a" (%) of the amount of money, and transmits the obtained ratio to the comparison means 33. The comparison means 33 then obtains, as a threshold value, a predetermined ratio "b" (%) of the "new" or "old" money from threshold value setting means 34 (FIG. 3). The comparison means 33 also receives, from the counting means 32, the ratio "a" (%) of the "new" or "old" money to the money used for supplementation, and compares the ratio "a" (%) with the threshold value "b" (%). If the ratio "a" (%) of "new" (or "old") money to the money used for supplementation is greater (or smaller) than the threshold value "b" (%), the "old" money in the money that is input and identified by the identification means 22 is transferred to and collected by the second receipt means 25. If the ratio "a" (%) of "new" (or "old") money to the money used for supplementation is smaller (or greater) than the threshold value "b" (%), the "old" money in the money that is input and identified by the identification means 22 is transferred to the first receipt means 24 to be used as money for payment.

When the money used for supplementation includes both "old" money and "new" money, through the above processing sequence, the apparatus 20 of the invention can control the amount of "old" money that is collected in accordance with the ratio of "new" (or "old") money relative to the money used for supplementation. As a result, it is possible to prevent the apparatus 20 of the invention from collecting more than is necessary of the "old" money, even though the ratio of "new" money to the money used for supplementation is small.

By way of example, for the case wherein the money input is identified and collected in accordance with the type and the amount that is input, money having a specific value may be newly issued and is gradually being distributed in the market. In this case, generally, it takes time for the "new" money to be fully distributed. Further, the ratio of the "new" money to the money that is input at the apparatus 20 is also gradually increased as time elapses following the issue of the "new" money. Therefore, when the ratio of "new" money relative to the money input at the apparatus 20 is monitored, the state of the distribution in the market of the "new" money can be predicted, and based on this prediction, the amount of "old" money to be collected can be adjusted.

Specifically, the identification means 22 ascertains whether the input money is "new" or "old", and the identification results obtained by the identification means 22 are stored in the storage means 31 of the third means 23. The counting means 32 counts the amount of "new" or "old" money included in the money that is input and is stored in the storage means 31 over a predetermined period of time, and calculates the ratio "c" (%) of the amount of "new" or "old" money and transmits the ratio to the comparison means 33. The comparison means 33 obtains, as a threshold value, a predetermined ratio "d" (%) of "new" or "old" money using the threshold value setting means 34 (FIG. 3). The comparison means 33 receives, from the counting means 32, the ratio "c" (%) of the "new" (or ("old") money to the money input, and compares the ratio "c" (%) with the threshold value "d" (%). If the ratio "c" (%) of the "new" (or "old") money to the input money is greater (or smaller) than the threshold value "d" (%), the "old" money that is included in the money that is input and is identified by the identification means 22 is transferred to the second receipt means 25, and is collected. When the ratio "c" (%) of the "new" (or "old") money to the input money is smaller (or greater) than the threshold value "d" (%), the "old" money that is included in the money that is input and is identified by the identification means 22 is transferred to the first receipt means 24, and is to be used as money for payment.

Through this processing sequence, the apparatus 20 of the invention can control, in accordance with the ratio of "new" (or "old") money to the input money, the amount of "old" money that is collected. As a result, since the apparatus 20 of the invention can collect "old" money while predicting the distributed state of the "new" money on the market, it is possible to prevent the collection of more "old" money than is necessary, even though only a small amount of new money is distributed.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. An apparatus for inputting and outputting money comprising:

reception means for accepting money that is input;

first receipt means for storing money as money for payment;

second receipt means for storing money as money for recovery;

identification means for identifying said money that is input through said reception means, said identification means determining the type of said money that is input and the type of said money used for supplementation and identifying money for supplementing said money stored in said first receipt means; and third means for comparing said money that is input, which has been identified by said identification means, with money for supplementing said money stored in said first receipt means, and for transferring said money that is input to either said first or said second receipt means and wherein when only new money is used for supplementation and when said type of said money that is input matches said money used for supplementation, said third means transfers said money that is input to said first receipt means; and wherein, when said type of said money that is input does not match said type of said money used for supplementation, said third means transfers said money that is input to said second receipt means.

2. The apparatus according to claim 1, wherein, in accordance with the ratio of said money that is input having the same type as that to be collected, relative to all the money for supplementation that has been identified, said third means determines whether said money that is input is to be transferred to said first or to said second receipt means.

3. The apparatus according to claim 1, wherein said third means includes:

storage means for storing the type of money that is identified, and calculation means for employing the type of said money that is input and that is stored in said storage means to determine the ratio of the amount of money for each type; and wherein, from among said ratios of the amounts of individual money types that are obtained by said calculation means, said third means employs the ratio of the amount of said money that is input that is the same type as that to be collected, and determines whether said money that is input should be transferred to said first or to said second receipt means.

4. The method for an apparatus for inputting and outputting money, for identifying money that is input and for collecting said money, comprising the steps of:

(a) receiving money that is input;

(b) identifying said money that is input and determining the type of said money that is input and the type of said money that is input that is to be used for supplementation, of said apparatus; and (c) comparing said money that is input, and that is identified, with said type of said money used for supplementation and with in said apparatus that is used for supplementation, and determining whether said money that is input should be output or collected wherein, at said step (c), said money that is input is determined to be money as money br payment when only new money is used for supplementation, and when said type of money that is input matches said type of money used for supplementation; and wherein said money that is input is determined to be money as money for recovery when said type of said money that is input does not match said type of money used for supplementation.

5. The method according to claim 4, wherein said step (c) includes the steps of:

determining the ratio of said money that is input and that is the same type as that which is to be collected relative to said money that is used for supplementation and employing said ratio to determine whether said money that is input should be used as money for payment or money for recovery.

6. The method according to claim 4, wherein said step (c) includes the step of storing the types of money that are identified, and employing the typos of money that are input and are stored to determine the ratio of the amount of money for each type; and wherein, using said obtained ratios for said amounts of said money for individual types, the ratio of the amount of said money that is input that is the same type as money to be collected is employed to determine whether said money that is input should be used as money for payment or as money for recovery.

* * * * *